(12) United States Patent
Pohl (10) Patent No.: US 12,380,657 B1
(45) Date of Patent: Aug. 5, 2025

(54) ADVANCED NETWORKING, DETECTION, AND DATA VISUALIZATION TECHNIQUES IN MULTIPLE NETWORKED DEVICES

(71) Applicant: Future Optek LLC, Boca Raton, FL (US)

(72) Inventor: Matthew Pohl, Boca Raton, FL (US)

( * ) Notice: Subject to any disclaimer, the term of this patent is extended or adjusted under 35 U.S.C. 154(b) by 311 days.

(21) Appl. No.: 18/094,359

(22) Filed: Jan. 8, 2023

Related U.S. Application Data (60) Provisional application No. 63/277,183, filed on Nov. 9, 2021.

(51) Int. Cl.
*G06T 19/00* (2011.01)
*H04L 41/22* (2022.01)

(52) U.S. Cl.
CPC ............ *G06T 19/006* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 9,285,589 | B2 * | 3/2016 | Osterhout | G02B 27/017 |
| 10,139,631 | B1 * | 11/2018 | Da Veiga | G05D 1/0094 |
| 10,140,754 | B1 * | 11/2018 | Voris | G06F 3/04845 |
| 12,189,736 | B1 * | 1/2025 | Salter | G06V 40/18 |
| 2016/0079660 | A1 * | 3/2016 | Bevelacqua | H01Q 9/065 |
| | | | | 343/702 |
| 2016/0297545 | A1 * | 10/2016 | Yang | B64U 10/13 |
| 2017/0092109 | A1 * | 3/2017 | Trundle | B60L 53/305 |
| 2018/0096588 | A1 * | 4/2018 | Shabah | G06Q 50/265 |
| 2018/0126241 | A1 * | 5/2018 | Hung | G06F 3/011 |
| 2018/0217589 | A1 * | 8/2018 | Kim | H04N 23/631 |
| 2019/0025815 | A1 * | 1/2019 | Saadoun | G06F 3/0383 |
| 2019/0027113 | A1 * | 1/2019 | Kaine | G06F 3/012 |
| 2019/0077519 | A1 * | 3/2019 | Husain | B64F 1/222 |
| 2019/0112049 | A1 * | 4/2019 | Phan | B64U 10/16 |
| 2019/0174149 | A1 * | 6/2019 | Zhang | H04N 21/4728 |
| 2019/0258313 | A1 * | 8/2019 | Sun | G06V 40/176 |
| 2019/0287413 | A1 * | 9/2019 | Walton | G08G 5/22 |

(Continued)

OTHER PUBLICATIONS

He Di et al. "Wireless Localization Method Using the Distributed Iterative Stochastic-Resonance-Based Signal Spectral Combination." IEEE Access, vol. 10, 2022, pp. 13059-70, https://doi.org/10.1109/ACCESS.2022.3144847, 12 pages. (Year: 2022).*

(Continued)

*Primary Examiner* — Martin Mushambo
(74) *Attorney, Agent, or Firm* — Gugliotta & Gugliotta LPA (57) ABSTRACT

The utilization of drones, mixed reality displays, novel networking techniques, advanced networking techniques (e.g., edge computing), and AI-driven data fusion and visualization. This combination of technologies is employed in tandem to provide advanced data visualization capabilities in mixed reality displays, primarily for usage between multiple devices including mixed reality displays, drones, and other systems that would support networking and data collection capabilities. These capabilities are primarily intended for usage between multiple mixed reality displays, although could be applied to robots, autonomous vehicles, guidance systems, weapon systems, and detection systems.

8 Claims, 6 Drawing Sheets

(56) References Cited

U.S. PATENT DOCUMENTS

| | | | |
|---|---|---|---|
| 2019/0369613 A1* | 12/2019 | Moon | G05D 1/0033 |
| 2019/0385342 A1* | 12/2019 | Freeman | G06T 11/00 |
| 2020/0126413 A1* | 4/2020 | Sham | G08G 1/165 |
| 2020/0307437 A1* | 10/2020 | Thieberger | G05D 1/6985 |
| 2021/0096385 A1* | 4/2021 | Gupta | G02B 27/32 |
| 2021/0365047 A1* | 11/2021 | Rao | B64U 70/93 |

OTHER PUBLICATIONS

Mai Znenzhen, et al. "Mobile Target Localization and Tracking Techniques in Harsh Environment Utilizing Adaptive Multi-modal Data Fusion." IET Communications, vol. 15, No. 5, 2021, pp. 736-747, https://doi.org/10.1049/cmu2.12116. 12 pages. (Year: 2021).*
Sheng Yao bin et al. "Monitoring underground coal mining-induced subsidence.", 2010, Surveying Technical Available online at https://www.ee.co.za/wp-content/uploads/legacy/PositionIT%202009/PositionIT%202010/monitoring%20underground.pdf, 6 pages. (Year: 2010).*
Jihao Yin et al. "A Simple and Accurate TDOA-AOA Localization Method Using Two Stations." IEEE Signal Processing Letters vol. 23, No. 1, 2016, pp. 144-148, https://doi.org/10.1109/ LSP.2015.2505138, 5 pages. (Year: 2016).*
Nguyen, Ngoc Hung, and Kutluyil Dogancay. "Optimal Geometry Analysis for Multistatic TOA Localization" IEEE Transactions on Signal Processing, vol. 64, No. 16, 2016, pp. 4180-4193, https://doi.org/10.1109/TSP.2016.2566611, 14 pages. (Year: 2016).*
Garcia-Fernandez, Maria, et al. "Analysis and Validation of a Hybrid Forward-Looking Down- Looking Ground Penetrating Radar Architecture." Remote Sensing, vol. 13, No. 6, 2021, p. 1206-1224, https://doi.org/10.3390/rs13061206, 18 pages. (Year: 2021).*
Liang, Fulai, et al. "Detection of Multiple Stationary Humans Using UWB MIMO Radar." Sensors, No. 11, 2016, vol. 16, p. 1922-1939, https://doi.org/10.3390/s16111922, 17 pages. (Year: 2016).*
Cota-Ruiz, Juan, et al. "A Low-Complexity Geometric Bilateration Method for Localization in Wireless Sensor Networks and Its Comparison with Least-Squares Methods." Sensors (Basel, Switzerland), vol. 12. No. 1. 2012, pp. 839-862. https://doi.org/10.3390/s120100839, 24 pages. (Year: 2012).*
Zhang, song, and shing-Tung Yau. "High-Resolution, Real-Time 3D Absolute Coordinate Measurement Based on a Phase-Shifting Method." Optics Express, vol. 14, No. 7, 2006, pp. 2644-2649. https://doi.org/10.1364/0E.14.002644, 6 pages. (Year: 2006).*
Go, Seungryeol, and Jong-Wha Chong. "Improved TOA-Based Localization Method with BS Selection Scheme for Wireless Sensor Networks." ETRI Journal, vol. 37, No. 4, 2015, pp. 707-716, https://doi.org/10.4218/etrij.15.0114.1251, 10 pages.
Ginzburg, B., et al. "Investigation of Advanced Data Processing Technique in Magnetic Anomaly Detection Systems." International Journal on Smart Sensing and Intelligent Systems, vol. 1, No. 1, 2008, pp. 110-122, https://doi.org/10.21307/ijssis-2017-281, 13 pages.
Herold, David, et al. "Lightweight, High-Bandwidth Conformal Antenna System for Ballistic Helmets." MILCOM 2007—IEEE Military Communications Conference, IEEE, 2007, pp. 1-6, https://doi.org/10.1109/MILCOM.2007.4455055, 6 pages.
Chen, Siyuan, et al. "A Survey of Robot Swarms' Relative Localization Method." Sensors (Basel, Switzerland), vol. 22, No. 12, 2022, p. 4424-, https://doi.org/10.3390/s22124424, 21 pages.
Wissmeyer, Georg, et al. "Looking at Sound: Optoacoustics with All-Optical Ultrasound Detection." Light, Science & Applications, vol. 7, No. 1, 2018, pp. 53-16, https://doi.org/10.1038/s41377-018-0036-7, 16 pages.
Hao, Zhanjun, et al. "Millimeter-Wave Radar Localization Using Indoor Multipath Effect." Sensors (Basel, Switzerland), vol. 22, No. 15, 2022, p. 5671-, https://doi.org/10.3390/s22155671, 18 pages.
Singh, Munesh, and Pabitra Mohan Khilar. "Mobile Beacon Based Range Free Localization Method for Wireless Sensor Networks." Wireless Networks, vol. 23, No. 4, 2017, pp. 1285-1300, https://doi.org/10.1007/s11276-016-1227-x, 16 pages.
Wischounig-Strucl, Daniel, and Bernhard Rinner. "Resource Aware and Incremental Mosaics of Wide Areas from Small-Scale UAVs." Machine Vision and Applications, vol. 26, No. 7-8, 2015, pp. 885-904, https://doi.org/10.1007/s00138-015-0699-5, 20 pages.
Yang, Runfeng, Sherratt, R.. "Multiband OFDM Modulation and Demodulation for Ultra Wideband Communications". Novel Applications of the UWB Technologies, edited by Boris Lembrikov, IntechOpen, 2011. https://doi.org/10.5772/16700, 17 pages.
Aziz, M. A., and C. T. Allen. "Experimental Results of a Differential Angle-of-Arrival Based 2D Localization Method Using Signals of Opportunity." International Journal of Navigation and Observation, vol. 2018, Mar. 25, 2018, pp. 1-6, https://doi.org/10.1155/2018/5470895, 7 pages.
Jacobellis, George, et al. "Experimental and Computational Investigation of Stacked Rotor Performance in Hover." Aerospace Science and Technology, vol. 116, May 27, 2021, p. 106847-, https://doi.org/10.1016/j.ast.2021.106847, 14 pages.
Pang, Hongfeng, et al. "Integrated Compensation of Magnetometer Array Magnetic Distortion Field and Improvement of Magnetic Object Localization." IEEE Transactions on Geoscience and Remote Sensing, vol. 52, No. 9, 2014, pp. 5670-5676, https://doi.org/10.1109/TGRS.2013.2291839, 7 pages.
Jin, Huanghuang, et al. "Magnetic Anomaly Detection and Localization Using Orthogonal Basis of Magnetic Tensor Contraction." IEEE Transactions on Geoscience and Remote Sensing, vol. 58, No. 8, Aug. 2020, pp. 5944-5954, https://doi.org/10.1109/TGRS.2020.2973322, 11 pages.
Wang, Mingchao, et al. "Multiobject Localization Using Magnetic Tensor Gradiometer Array and Improved iForest." IEEE Geoscience and Remote Sensing Letters, vol. 19, 2022, pp. 1-5, https://doi.org/10.1109/LGRS.2021.3122457, 5 pages.
Lupu, Nicoleta. "Applications to automation: sensors and communication." National Institute of R&D for Technical Physics ESM2021, 2021, Iaşi, Romania, Available online at at https://magnetism.eu/esm/2021/slides/slides-lupu-2.pdf as early as Mar. 2022, 121 pages.
Pannert, Wolfram. "Spatial Smoothing for Localized Correlated Sources—Its Effect on Different Localization Methods in the Nearfield." Applied Acoustics, vol. 72, No. 11, 2011, pp. 873-883, https://doi.org/10.1016/j.apacoust.2011.05.011, 11 pages.
Chang, Shengming, et al. "3-D RSS-AOA Based Target Localization Method in Wireless Sensor Networks Using Convex Relaxation." IEEE Access, vol. 8, 2020, pp. 106901-106909, https://doi.org/10.1109/ACCESS.2020.3000793, 9 pages.
Gupta, Abhishek, and Xavier Fernando. "Simultaneous Localization and Mapping (SLAM) and Data Fusion in Unmanned Aerial Vehicles: Recent Advances and Challenges." Drones (Basel), vol. 6, No. 4, 2022, p. 85-, https://doi.org/10.3390/drones6040085, 35 pages.
Cheng, Xin, et al. "Optimal Measurement of Drone Swarm in RSS-Based Passive Localization With Region Constraints." IEEE Open Journal of Vehicular Technology, vol. 4, 2023, pp. 1-11, https://doi.org/10.1109/OJVT.2022.3213866, 9 pages.
Kostli, K. P., et al."Optoacoustic Imaging Using a Three-Dimensional Reconstruction Algorithm." IEEE Journal of Selected Topics in Quantum Electronics, vol. 7, No. 6, 2001, pp. 918-923, https://doi.org/10.1109/2944.983294, 6 pages.
Cho, Seong Yun, et al. "P2P Ranging-Based Cooperative Localization Method for a Cluster of Mobile Nodes Containing IR-UWB PHY." ETRI Journal, vol. 35, No. 6, 2013, pp. 1084-1093, https://doi.org/10.4218/etrij. 13.0112.0823, 10 pages.
Yang, Zheng, and Yunhao Liu. "Quality of Trilateration: Confidence-Based Iterative Localization." IEEE Transactions on Parallel and Distributed Systems, vol. 21, No. 5, 2010, pp. 631-640, https://doi.org/10.1109/TPDS.2009.90, 10 pages.
Kalkan, Yilmaz, and Buyurman Baykal. "Frequency-Based Target Localization Methods for Widely Separated MIMO Radar." Radio Science, vol. 49, No. 1, 2014, pp. 53-67, https://doi.org/10.1002/2013RS005245, 15 pages.
Soares, Claudia, et al. "Range and Bearing Data Fusion for Precise Convex Network Localization." IEEE Signal Processing Letters, vol. 27, 2020, pp. 670-674, https://doi.org/10.1109/LSP.2020.2988178, 5 pages.
Iliev, Nick, and Igor Paprotny. "Review and Comparison of Spatial Localization Methods for Low-Power Wireless Sensor Networks."

(56) References Cited

OTHER PUBLICATIONS

IEEE Sensors Journal, vol. 15, No. 10, 2015, pp. 5971-5987, https://doi.org/10.1109/JSEN.2015.2450742, 17 pages.
Elijah, Thato, et al. "A Review on Control and Maneuvering of Cooperative Fixed-Wing Drones." International Journal of Dynamics and Control, vol. 9, No. 3, 2021, pp. 1332-1349, https://doi.org/10.1007/s40435-020-00710-2, 18 pages.
Oliva, Gabriele, et al. "Sensor Networks Localization: Extending Trilateration via Shadow Edges." IEEE Transactions on Automatic Control, vol. 60, No. 10, 2015, pp. 2752-2755, https://doi.org/10.1109/TAC.2015.2404253, 4 pages.
Yang, Mengna, et al. "A TDOA Localization Method for Nonline-of-Sight Scenarios." IEEE Transactions on Antennas and Propagation, vol. 67, No. 4, 2019, pp. 2666-2676, https://doi.org/10.1109/TAP.2019.2891403, 11 pages.
Padois, Thomas, et al. "Acoustic Source Localization Using a Polyhedral Microphone Array and an Improved Generalized Cross-Correlation Technique." Journal of Sound and Vibration, vol. 386, 2017, pp. 82-99, https://doi.org/10.1016/j.jsv.2016.09.006, 18 pages.
Kolawole, F., et al. "Aeromagnetic, Gravity, and Differential Interferometric Synthetic Aperture Radar Analyses Reveal the Causative Fault of the Apr. 3, 2017 Mw 6.5 Moiyabana, Botswana, Earthquake." Geophysical Research Letters, vol. 44, No. 17, 2017, pp. 8837-8846, https://doi.org/10.1002/2017GL074620, 15 pages.
Shi, Zhiguo, et al. "An Acoustic-Based Surveillance System for Amateur Drones Detection and Localization." IEEE Transactions on Vehicular Technology, vol. 69, No. 3, 2020, pp. 2731-2739, https://doi.org/10.1109/TVT.2020.2964110, 9 pages.
Shahsavani, Hashem. "An Aeromagnetic Survey Carried Out Using a Rotary-Wing UAV Equipped with a Low-Cost Magneto-Inductive Sensor." International Journal of Remote Sensing, vol. 42, No. 23, 2021, pp. 8805-8818, https://doi.org/10.1080/01431161.2021.1930269, 15 pages.
Idrissi, Moad, et al. "A Review of Quadrotor Unmanned Aerial Vehicles: Applications, Architectural Design and Control Algorithms." Journal of Intelligent & Robotic Systems, vol. 104, No. 2, 2022, https://doi.org/10.1007/s10846-021-01527-7, 33 pages.
Nuster, Robert, et al. "High Resolution Three-Dimensional Photoacoustic Tomography with CCD-Camera Based Ultrasound Detection." Biomedical Optics Express, vol. 5, No. 8, 2014, p. 2635-, https://doi.org/10.1364/BOE.5.002635, 13 pages.
Laar, Piërre van de., et al. "Situation Awareness with Systems of Systems." Springer, 2013, https://doi.org/10.1007/978-1-4614-6230-9, 272 pages.
Li, Chengjing, et al. "Detection Range of Airborne Magnetometers in Magnetic Anomaly Detection." Journal of Engineering Science and Technology Review, vol. 8, No. 4, 2015, pp. 105-110, https://doi.org/10.25103/jestr.084.17, 6 pages.
Nichols, Schuyler. "Experimental Approach to the Feasibility of an Axially-Stacked Propeller System", Master Thesis in Science, University of Cincinnati, Jul. 2014, 83 pages.
Belt, David W. "Non-explosive Test Bed for Flux Compression Generator Fuses." Master Thesis in Science, Texas Tech University, Aug. 2006, 105 pages.
Lee, Taehwa, et al. "Fano-Like Acoustic Resonance for Subwavelength Directional Sensing: 0-360 Degree Measurement." Advanced Science, vol. 7, No. 6, 2020, p. 1903101-n/a, https://doi.org/10.1002/advs.201903101, 8 pages.
Biglarbegian, Behzad. "Integrated Antennas and Active Beamformers Technology for mm-Wave Phased-Array Systems", Doctoral Thesis in Philosophy, University of Waterloo, 2012, 169 pages.
Yuan, Min, et al. "Extremely High Sensitivity Magnetic Field Sensing Based on Birefringence-Induced Dispersion Turning Point Characteristics of Microfiber Coupler." Results in Physics, vol. 29, 2021, p. 104743-, https://doi.org/10.1016/j.rinp.2021.104743, 7 pages.
Liu, Jiao, et al. "Human Activity Sensing with Wireless Signals: A Survey." Sensors, vol. 20, Nov. 4, 2020, p. 1210-, https://doi.org/10.3390/s20041210, 45 pages.
Baranova, Vitalia E., Pavel F. Baranov, Sergey V. Muravyov, and Sergey V. Uchaykin. "Fluxgate magnetometer for measuring ultra low magnetic induction." In Measurement in Research and Industry: Proceedings of XXI IMEKO World Congress, pp. 1-4, 2015, 6 pages.
Ahmad, Fauzia, Moeness G. Amin, and Pawan Setlur. "Through-the-wall target localization using dual-frequency CW radars." In Sensors, and Command, Control, Communications, and Intelligence (C3I) Technologies for Homeland Security and Homeland Defense V, vol. 6201, pp. 133-144, SPIE, May 10, 2006, https://doi.org/10.1117/12.666019, 13 pages.
Zheng, Guoyan, et al. "Evaluation and Comparison of 3D Intervertebral Disc Localization and Segmentation Methods for 3D T2 MR Data: A Grand Challenge." Medical Image Analysis, vol. 35, Feb. 24, 2017, pp. 327-344, https://doi.org/10.1016/j.media.2016.08.005, 45 pages.
Santos, Ricardo, et al. "WLS Algorithm for UAV Navigation in Satellite-less Environments." IET Wireless Sensor Systems, vol. 12, No. 3-4, 2022, pp. 93-102, https://doi.org/10.1049/wss2.12041, 10 pages.
Poljak, Dragan, and Mario Cvetkovic. "Human Interaction with Electromagnetic Fields: Computational Models in Dosimetry.", Elsevier Science & Technology, 2019, ISBN: 978-0-12-816443-3, 269 pages.
Chen, Victor C. "The Micro-Doppler Effect in Radar, Second Edition". Artech house, 2019, 329 pages.
Zhao, Yuan, et al. "Microwave-Excited Hybrid Thermoacoustic and Ultrasound Imaging with Microwave Pulse-Width Modulation." AIP Advances, vol. 9, No. 1, 2019, pp. 15323-015323-6, https://doi.org/10.1063/1.5081913, 7 pages.
Neuber, Andreas A., and James C. Dickens. "Magnetic flux compression generators." Proceedings of the IEEE, vol. 92, No. 7, 2004, pp. 1205-1215, https://doi.org/10.1109/JPROC.2004.829001, 7 pages.
Klugman, Nicholas Edward. "Modeling and Design of Electromagnetic Flux Generators.", Master Thesis in Science, Massachusetts Institute of Technology, Feb. 2020, 111 pages.
Bin Abbas, Waqas, et al. "Device Free Detection in Impulse Radio Ultrawide Bandwidth Systems." Sensors (Basel, Switzerland), vol. 21, No. 9, 2021, p. 3255-, https://doi.org/10.3390/s21093255.
Zhi, Menghui, et al. "Digital Fluxgate Magnetometer for Detection of Microvibration." Journal of Sensors, vol. 2017, 2017, pp. 1-10, https://doi.org/10.1155/2017/6453243, 11 pages.
Sheng Xu, et al. "Distributed Path Optimization of Multiple UAVs for AOA Target Localization." 2016 IEEE International Conference on Acoustics, Speech and Signal Processing (ICASSP), IEEE, 2016, pp. 3141-3145, https://doi.org/10.1109/ICASSP.2016.7472256, 5 pages.
Safadinho, David, et al. "UAV Landing Using Computer Vision Techniques for Human Detection." Sensors (Basel, Switzerland), vol. 20, No. 3, 2020, p. 613-, https://doi.org/10.3390/s20030613, 36 pages.
Eltner, Anette, et al. "Image-Based Surface Reconstruction in Geomorphometry—Merits, Limits and Developments." Earth Surface Dynamics, vol. 4, No. 2, 2016, pp. 359-389, https://doi.org/10.5194/esurf-4-359-2016, 31 pages.
Rampa, Vittorio, et al. "Electromagnetic Models for Passive Detection and Localization of Multiple Bodies." IEEE Transactions on Antennas and Propagation, vol. 70, No. 2, 2022, pp. 1462-1475, https://doi.org/10.1109/TAP.2021.3111405, 13 pages.
Milan Mišković, et al. "Method for Direct Localization of Multiple Impulse Acoustic Sources in Outdoor Environment." Electronics (Basel), vol. 11, No. 16, 2022, p. 2509-, https://doi.org/10.3390/electronics11162509, 16 pages.
Wen, Shuang, and Guojie Luo. "FPGA-Accelerated Automatic Alignment for Three-Dimensional Tomography." 2020 IEEE 28th Annual International Symposium on Field-Programmable Custom Computing Machines (FCCM), IEEE, 2020, pp. 172-176, https://doi.org/10.1109/FCCM48280.2020.00031, 5 pages.
Wan, Pengwu, et al. "Passive Localization of Signal Source Based on UAVs in Complex Environment." China Communications, vol. 17, No. 2, 2020, pp. 107-116, https://doi.org/10.23919/JCC.2020.02.009, 10 pages.

(56) References Cited

OTHER PUBLICATIONS

Novotny, David, and Vojtech Petrucha. "High Dynamic Range Digital Fluxgate Magnetometer." 2020 IEEE Sensors, IEEE, 2020, pp. 1-4, https://doi.org/10.1109/SENSORS47125.2020.9278852, 4 pages.

Saeed, Rashid A., et al. "Performance of ultra-wideband time-of-arrival estimation enhanced with synchronization scheme." ECTI Trans. on Electrical Eng., Electronics and Communication 4.1 (2006): 78-84., 7 pages.

Yu, Baoguo, et al. "A Least Square-Based Self-Adaptive Localization Method for Wireless Sensor Networks." Mathematical Problems in Engineering, vol. 2016, 2016, pp. 1-9, https://doi.org/10.1155/2016/1892893, 10 pages.

Cobos, Maximo, et al. "A Survey of Sound Source Localization Methods in Wireless Acoustic Sensor Networks." Wireless Communications and Mobile Computing, vol. 2017, 2017, pp. 1-24, https://doi.org/10.1155/2017/3956282, 25 pages.

Liu, Huan, et al. "A Modular Magneto-Inductive Sensor for Low Vector Magnetic Field Measurements." Review of Scientific Instruments, vol. 92, No. 8, 2021, pp. 85110-085110, https://doi.org/10.1063/5.0063450, 7 pages.

Siddiqui, J. Rafid, et al. "A Novel Plane Extraction Approach Using Supervised Learning." Machine Vision and Applications, vol. 24, No. 6, 2013, pp. 1229-1237, https://doi.org/10.1007/s00138-013-0482-4, 9 pages.

Singhvi, Ajay, et al. "A Microwave-Induced Thermoacoustic Imaging System With Non-Contact Ultrasound Detection." IEEE Transactions on Ultrasonics, Ferroelectrics, and Frequency Control, vol. 66, No. 10, 2019, pp. 1587-1599, https://doi.org/10.1109/TUFFC.2019.2925592, 13 pages.

Yang, Bo, et al. "A Novel Trilateration Algorithm for RSSI-Based Indoor Localization." IEEE Sensors Journal, vol. 20, No. 14, 2020, pp. 8164-8172, https://doi.org/10.1109/JSEN.2020.2980966, 9 pages.

Shastri, Anish, et al. "A Review of Millimeter Wave Device-Based Localization and Device-Free Sensing Technologies and Applications." IEEE Communications Surveys and Tutorials, vol. 24, No. 3, 2022, pp. 1708-1749, https://doi.org/10.1109/COMST.2022.3177305, 42 pages.

Meng, Wei, and Wendong Xiao. "Energy-Based Acoustic Source Localization Methods: A Survey." Sensors (Basel, Switzerland), vol. 17, No. 2, 2017, pp. 376-376, https://doi.org/10.3390/s17020376, 20 pages.

Cantón Paterna, Vicente, et al. "A Bluetooth Low Energy Indoor Positioning System with Channel Diversity, Weighted Trilateration and Kalman Filtering." Sensors (Basel, Switzerland), vol. 17, No. 12, 2017, p. 2927-, https://doi.org/10.3390/s17122927, 32 pages.

Sheinker, Arie, and Mark B. Moldwin. "Magnetic Anomaly Detection (MAD) of Ferromagnetic Pipelines Using Principal Component Analysis (PCA)." Measurement Science & Technology, vol. 27, No. 4, 2016, p. 45104-, https://doi.org/10.1088/0957-0233/27/4/045104, 7 pages.

McCormick, Patrick M., et al. "Simultaneous Radar and Communications Emissions from a Common Aperture, Part I: Theory." The Institute of Electrical and Electronics Engineers, Inc. (IEEE) Conference Proceedings, The Institute of Electrical and Electronics Engineers, Inc. (IEEE), 2017, p. 1685-, https://doi:org/10.1109/RADAR.2017.7944478, 6 pages.

McCormick, Patrick M., et al. "Simultaneous Radar and Communication Emissions from a Common Aperture, Part II: Experimentation." The Institute of Electrical and Electronics Engineers, Inc. (IEEE) Conference Proceedings, The Institute of Electrical and Electronics Engineers, Inc. (IEEE), 2017, p. 1697-. https://doi.org/10.1109/RADAR.2017.7944480, 6 pages.

Etzlinger, Bernhard, and Henk Wymeersch. "Synchronization and Localization in Wireless Networks.", Now Publishers, 2018, https://doi.org/10.1561/2000000096, 114 pages.

Rhee, Dong Sop, et al. "Applications of Unmanned Aerial Vehicles in Fluvial Remote Sensing: An Overview of Recent Achievements." KSCE Journal of Civil Engineering, vol. 22, No. 2, 2018, pp. 588-602, https://doi.org/10.1007/s12205-017-1862-5, 15 pages.

Vasile, C., and C. Ioana. "Arc Fault Detection & Localization by Electromagnetic-Acoustic Remote Sensing." IOP Conference Series. Materials Science and Engineering, vol. 198, No. 1, 2017, p. 12009-, https://doi.org/10.1088/1757-899X/198/1/012009, 5 pages.

Garcia-Fidalgo, Emilio, and Alberto Ortiz. "Vision-Based Topological Mapping and Localization Methods: A Survey." Robotics and Autonomous Systems, vol. 64, 2015, pp. 1-20, https://doi.org/10.1016/j.robot.2014.11.009, 20 pages.

\* cited by examiner

ADVANCED NETWORKING, DETECTION, AND DATA VISUALIZATION TECHNIQUES IN MULTIPLE NETWORKED DEVICES

RELATED APPLICATIONS

There present invention claims the benefit of U.S. Provisional Application No. 63/277,183, filed on 9 Nov. 2021. Additional Related Applications (i.e., applications of related continuity) are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to augmented reality and its use in visualization techniques and, more particularly, to its use in advanced operations of multiple networked devices.

2. Description of the Related Art

Augmented reality eyepieces exist for use in visualization in many areas, including in conjunction with the utilization of drones. Such a combination of technologies can be employed in tandem to provide advanced data visualization capabilities in mixed reality displays, primarily for usage between multiple devices including mixed reality displays, drones, and other systems that would support networking and data collection capabilities. For example, as shown and described in U.S. Pat. No. 9,285,589, issued in the name of Osterhout et al., a comprehensive disclosure is provided of AR glasses that interface with sensors for triggered control to provide views of a surrounding environment to the headpiece.

While various uses are shown and provided in the prior art, additional advantages can exist from other advanced networking, detection, and data visualization techniques in multiple networked devices. Such advances and improvements are provided herein.

SUMMARY OF THE INVENTION

According to preferred aspects of the present invention, visualizations provided expressly through mixed reality glasses are capable of being realized, and useful, on both a VR and MR platform to equal extents. Visualizations, in mixed reality displays, coupled with one or more networked devices can yield both novel types of visualizations, capabilities, and overall, wholly new or otherwise improved interactions between devices. Such improvements may be realizable through a combination of said devices or providing significantly greater quality or capabilities of any of the devices alone.

According to other preferred aspects of the present invention, expand MR platforms may allow a modular hardware architecture to flexibly address hardware integrations for maximizing the applications realizable on a single platform. An overall system may utilize various devices in a modular mixed reality hardware architecture. Such a combination may enable the development and implementation of other complex systems which are predicated on the usage of hardware otherwise not present in existing mixed reality hardware platforms.

An open, modular hardware architecture streamlines development of such systems by obviating the limitations imposed by the hardware present in a mixed reality platform.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures, wherein like reference numerals indicate the same parts throughout the several views. The present improvements in the application of augmented reality and its use in visualization techniques according to the present invention include, generally:

1. the use of mixed reality user interfaces (Displays/Eyewear) 100;
2. to acquire target imaging input (Sensors) 200; and
3. coordinated by or through a multi-drone hosted network 300 in specific deployment geometries and in conjunction with the operation of other multiple networked devices.

1. Mixed Reality Displays/Eyewear

Figure 1:
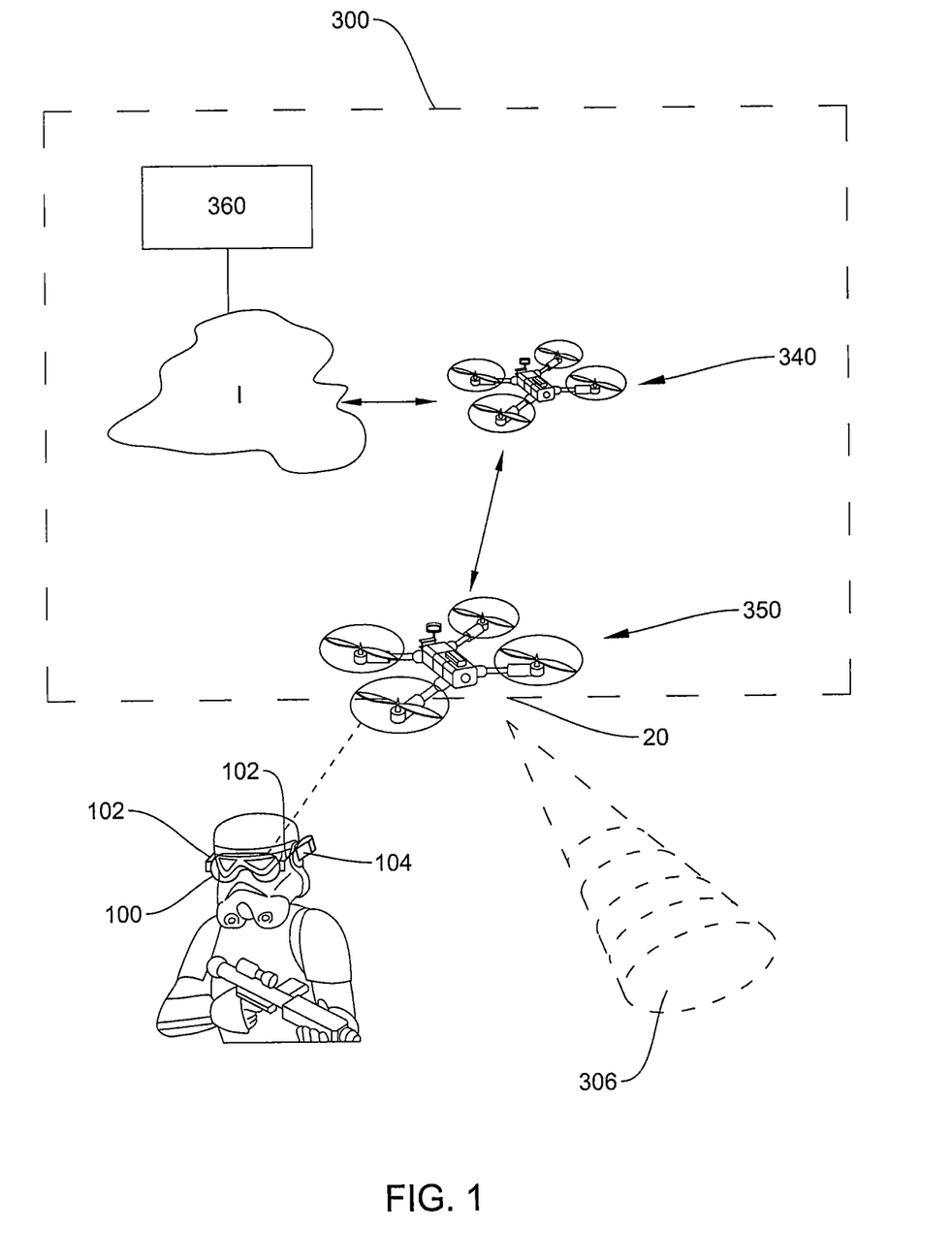
FIG. 1 is a general schematic of a system for data visualization in multiple networked devices according to the preferred embodiment of the present invention.

According to one aspect of the present invention, a hardware implementation of and improved display 100 having a waveguide may be provided including mixed reality (MR) or otherwise 'see-through-displays' as described in the Related Applications and incorporated by reference as if fully rewritten herein. Such mixed reality displays 100 may comprise a waveguide lens and an optical element or otherwise a means of light projection, light propagation, or the excitation of materials to elicit visible light perceivable to the eye as defined by a component which communicates image or video visualized data to the optical element. Adjustments to the visualized data meant to be perceived may be communicated in a manner compatible with the waveguide lens in respect to it propagating visible light to the eye in a manner interpretable to the retina and equivalent to digital visualization originally communicated to the component which interfaces with the optical element. This may include one or two waveguide lenses, which could transmit light in a perceptible form to one or both eyes, such as one lens corresponding to one eye, one lenses perceptible to both eyes, and two lenses perceptible to each eye. An Inertial Measurement Unit (IMU) may be situated closest to the eye to ensure orientation associated measurements relative to the head are maximized in accuracy. A USB-C data communication and charging port may allow for firmware updates to a microprocessor or CPU and associated microcontrollers and charging of a rechargeable battery which powers one or two waveguide displays, IMUs, optical elements, MPU/CPU, and MCU where if two separate waveguides are utilized may power and allow transmission of data via a connector along the length of the glasses' bridge, or underneath the lenses and nose bridge, or both.

The glasses 100 may be modular in that its arms 102 may be removed for the incorporation of one or more different arms 102 that can host additional integrated hardware 104 associated with providing the functionality, sensors, and imaging systems to fulfill a specific need or usage which interfaces with the MPU, connects via another USB-C port which allows bidirectional power and data communication and is exposed by removing the arm.

An additional USB-C port may be provided fulfilling the same functionality and may be situated on top of the remaining, original, non-detachable part of the arm 102 hosting the integrated hardware 104, and below it. This can allow the addition of modular hardware systems 104 intended to provide specific functionalities and incorporates specific features intended to be visualized in the mixed reality display 100 as needed, with the modular components not necessarily being the transmitter of image or video data for visualization as it may occur on another associated modular component which communicates between each other via the network 300 or its MPU/CPU, wirelessly, or its own connectable components which occur outside of the embedded hardware in the mixed reality display as needed. Modular components may host their own power systems, sensors, cameras, wireless communication systems, and acoustic systems as determined per the specific capabilities they provide. In the usage of two separate waveguide displays, entirely separate visualizations corresponding to one or more modular additions may be utilized, such as to perform two distinct functionalities simultaneously.

The system overall requires an MPU/CPU, MCU, and described USB-C ports for each arm 102 of the glasses 100, with a corresponding optical element and waveguide lens if two waveguide MR displays are used. Modular components may have their own respective control systems such as buttons to trigger respective commands to the modular addition corresponding to potentially software or digital features or operation of physical sensors and components.

A region located on top of the glasses bridge, where power and data bidirectional transmission may be located, may allow the addition of add-ons with physical features distinct from the waveguide lenses such as tinting, polarization, a protective visor, or induced phenomena in the transparent add-on lens triggered by other modular additions, or the incorporation of hardware with the add-on external transparent lens, or otherwise in front of the waveguide lenses, potentially hosting hardware, sensors, cameras, wireless transmitters and receivers which do not interface with the primary MR systems MPU/CPU and hardware.

Another embodiment may allow it to receive data transmitted between waveguide lenses and power, with their transmission split.

Such a configuration for displays/eyewear 100 may allow substantially benefits, including reduced production costs of mixed reality display devices, by allowing the modular addition of sensors, computer and graphics processors, cameras, wireless communication systems, as they are needed rather than making them a central, embedded part of the overall mixed reality display. Additionally, this expands potential functionalities beyond what the form factor of a mixed reality headset, glasses, HMD, HUD, or similar can allow. For mixed reality devices utilizing waveguides, or optical see through mixed reality displays (OST-MR), this introduces lower platform manufacturing complexity, manufacturing costs, manufacturing time, supply chain needs, and could overall alleviate production stress induced by demand for waveguide lens manufacturers allowing greater manufacturing outputs to be realized by reducing the need for various manufacturers to configure production lines to meet the specific qualities associated with a waveguide lens, its specifications, which correspond to different devices and specifications, especially when many OST-MR devices overall share and deliver similar capabilities and functionalities which otherwise could be implemented in a more standardized, modular system that otherwise does not necessitate the usage of other components which are also strained in demand such as high performance CPUs and GPUs.

Such platforms further can be more easily configured to address specific functionalities that would otherwise require hardware level integrations not present in existing platforms. This can be an open architecture made available to mixed reality developers of software, hardware, or the combination of both, allowing the innovation and commercialization of countlessly further capabilities, and remove barriers to entry associated with building a dedicated system to serve a functionality otherwise not anticipated by other OST-MR device manufacturers by the hardware level constraints imposed by their platforms. An open architecture software and hardware platform can be made available to developers and allow small businesses to focus on developing the hardware necessary for their functionalities and associated supply chain.

Such improvement further facilitates usage of the native platform with the allowance of software-development-kits (SDKs) for commercial purposes. Such greater internal focus can thereby be placed on further research and development of new generations of hardware and OST-MR devices as innovation surrounding waveguide-based displays grows and allow innovation addressing numerous anticipated industry specific needs to be addressed effectively by a greater number of pursuers. Developers of hardware module add-ons are also able to create their own royalty system for usage of their hardware by pure software developers.

The introduction of such a modular platform facilitates improved innovation on magnitudes greater than present in this area including research, would allow greater industry benefits to be identified and pursued than would be otherwise allowed under existing system platforms fundamentally constrained by their innate hardware, and reduce supply chain pressures in relevant manufacturing areas.

2. Imaging Input Sensors

Sensors using spectral, acoustical, optical (including visible light, near infrared, infrared, far infrared, UV, and X-ray), radio frequency, and magnetic signatures and associated fingerprints may be initially modeled and established via supervised machine learning. Signatures and fingerprints can, for example, be adapted for sensing of human bodies. Various other sensor calibrations may be implemented, such as to identify various specified objects, such as a vehicle, firearm, military hardware, drones.

When used in conjunction with imaging radar, a Multiple Input Multiple Output (MiMo) antenna array may be leveraged for high-resolution detection, mapping and tracking of multiple static and dynamic targets simultaneously. Combining 3D imaging with doppler analysis, an additional dimension—velocity—may be identified and utilized. Such a four-dimensional (4D) imaging radar system measures the time of flight from each transmitting (Tx) antenna 302 to a target and back to each receiving (Rx) antenna 304, processing data from the numerous ellipsoids 306 formed. The point at which the ellipsoids 306 intersect-known as a hot spot-reveals the exact position of a target at any given moment.

The doppler effect coupled with the motion of sensor and the back scatter of light, such imaging radar can achieve several advantages. It can operate in the presence of obstacles that obscure the target, and can penetrate ground (sand), water, or walls. A traditional radar application displays a position and motion of typically highly reflective objects (such as aircraft or ships) by sending out a radio wave signal, and then detecting the direction and delay of the reflected signal. In contrast, imaging radar attempts to form an image of one object (e.g., a landscape) by further registering the intensity of the reflected signal to determine the amount of light scattering, with the registered electromagnetic scattering then being mapped onto a two-dimensional plane with points with a higher reflectivity getting assigned usually a brighter color, thus creating an image.

Figure 2:
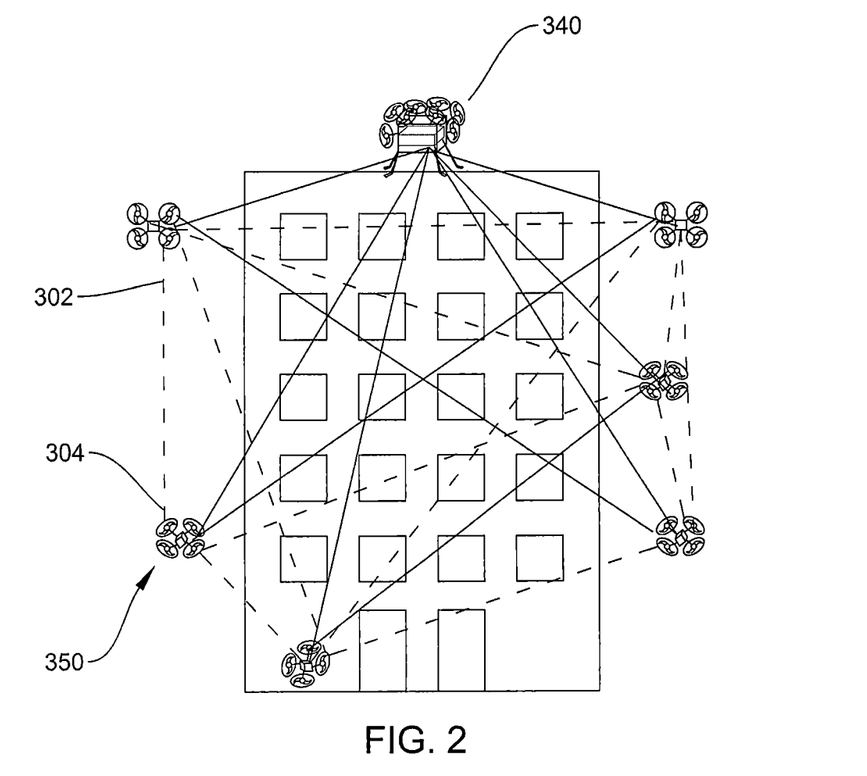
FIG. 2 is a schematic of the scanning of a 3D structure using six dependent networked drones.

When implemented in conjunction with the eventual utilization onto MR displays 100, a baseline scan is first established of the direct surface and is processed locally by a master drone 340 of a drone geometry network 345, as described in greater detail below. This establishes a geometric distribution of flight positions relative to the scene for the dependent drones 350 in addition to the central area for the master drone 340 to situate itself and possibly land. This can involve LIDAR and visible spectrum cameras aided by computer vision interpretation processed onboard the master drone.

A second baseline scan may be the established in a subsequent step. The process for data collection may be pursued in the system through any of three primary approaches: gathering full spectrum information for a drone's point-of-view before doing so for the next drone, limiting the hyperspectral imaging to a range of wavelengths such as NIR to increase the speed of data collection and, after all data collection steps are complete, for all the drones changing of the wavelength range and repeating, or collecting full hyperspectral data per each drone 340, only once, with non-emitting drones measuring backscatter of the emitting drone. Speed may be necessary as the scene could be dynamic, with rapid landscape change precluding data fusion without computationally costly processes. Limiting the spectral range could present similar difficulties and issues with accuracy.

The third approach listed is a balance between these variations, allowing error and distortions to still be recognized and eventually corrected, and assembling an accurate hyperspectral image for a given drone 350; with the context provided by the master drone 340, backscatter measured by non-emitting drones 350, data fusion can still be reasonably pursued as well as the creation of hyperspectral synthetic aperture super resolution.

To reduce latency in the system, the master drone 340 may communicate data in an edge computing network to a non-local site 360, as it is incrementally gathered, to reduce hardware and computational demands in the master drone 340. This is true particularly for caching data, and its analysis for signature patterns. An embodiment with reduced capabilities where only limited pre-selected signatures are searched for in gathered data could be implemented to allow the system to successfully operate without reliance on a non-local site for edge computing. This may be desirable when only a limited number of remotely sensed and identified signatures have value to the operator, real time analysis is sought, and the location or scenario of use limits or precludes the ability to leverage non-local sites for fulfilling more intensive computational demands.

A second baseline may be established following an initial hyperspectral scan of the scene, after which it can be iteratively updated either per changes in the scene, or to add further spectral detail such as if the limited wavelength range iterative data collection approach is employed. Once the second baseline is established, following standardization, feature matching, and data fusion, spectral and other remotely sensed data (e.g., 5G millimeter wave radar imaging, acoustic data) may be analyzed by pre-trained AI or machine learning models to identify and match the gathered data to pre-established signature models. Edge networking 360 connecting the master drone 340 to a non-local site for processing the data may be utilized to enable real time implementation, as well as to reduce the computational demands and associated hardware placed on the master drone 340. Fuzzy numbers and math can be used to more efficiently match data to signature models in both local and non-local data processing.

Constituent materials, objects, and bodies within a scene may be identified by matching gathered data to signature models. After completion of the second baseline, if insufficient data has been gathered to identify all signatures within a scene, primarily in respect to a 3D structure, the dependent drones 350 may adjust their positions to increase their proximity to an area of the scene where the 'density' of the gathered data is markedly lower than its surrounding regions. After adjusting their positions, the drones will repeat the process of data collection. Following this the second baseline will be complete, or the drones will continue to repetitively adjust their positions and initiate data collection processes until the either the baseline is complete for the scene or physical barriers prevent the drones from adjusting their positions further to encompass a narrower area. In the event where the drones must adjust their positions and repeat data collection processes in effort to complete the second baseline, the data gathered after completing a sequence of remote sensing processes for the drones' present positions may be iteratively analyzed for signatures in tandem with the execution of subsequent data collection sequences performed in the drones' newly adjusted positions; as each subsequent sequence is completed, the associated data may be fused with previously gathered data and analyzed for new, undetected signatures.

Following completion and analysis of the second baseline, the drones may limit wavelengths employed in hyperspectral imaging and other remote sensing methods correspondent to sensing specific signatures of interest. In doing so, the newly gathered data may be used to localize, and actively update spatial graphics and representations of the scene to identify changes in the positions of signatures of interest over an interval of time, or due to a newly introduced presence.

Through this implementation, the computational demand placed on the local system may be substantially alleviated after completion of the second baseline. This may also allow computing resources to be dedicated towards other demands, such as the real time localization of networked mixed reality devices and the delivery of graphical representations of the data collected by the drones to the devices.

Further, by having both a set of symmetrical viewing angles for each axis, with the dependent drones, coupled with the central master drone, super resolution may be achieved in the system for any given object or body in a given scene. From these aspects, the centroid or center of a gravity of an image and its light distribution may be determined. Additionally, the geometric arrangement's application to super resolution in this context can also be employed as a means of localizing imaged targets.

In commercial applications, sensor calibrations may be adapted for identification of elements and minerals sought in prospecting, alongside associated properties of the designated object. Surface and sub-surface sensing applications of the Invention for usage of prospecting can detect resources such as oil, natural gas, metals, and minerals indirectly, where instead of identifying signatures directly related to the designated object's properties and presence, signatures related to surface and sub-surface features, structures, formations, deposits, and objects commonly associated with the presence of the designated object can be employed for detection, and can benefit from further enhanced accuracy through the usage and application of machine learning and AI derived models trained to detect signatures associated with designated objects.

Such an aspect of the invention may be employed in construction, where the presence of sub-surface structures such as plumbing or electrical infrastructure can be detected, and its location visualized in a mixed reality display. The visualizations may be triggered for display through correlating the mixed reality display user's head orientation alignment with the line-of-sight presence of the designated object. By way of example, and not meant as limitations, in submarine sensing, submarines may employ numerous methods and properties to reduce their signature strength. However, utilizing supervised machine learning in initial training can establish an associated signature or fingerprint model accounting for these methods and properties employed by submarines to evade detection.

A purpose of establishing models of signatures and fingerprints, respective to the sensing technology and techniques used for identifying an object, can be for filtering. While it can be implied that those signatures and fingerprints are pre-established for usage outside of training, it is also intended for data filtering in effort to reduce computational hardware demands, latency, costs, and form factors needed to achieve nominal detection sensitivity, visualization resolution, physical speed of operations (e.g., such as drone movement relative to limits imposed to achieve nominal outcomes), and latency of computational and network processes for real time usage.

With the methods and uses described herein, achieving detection and visualization capabilities may be only part of the issues addressed. Further, effective implementation may be accomplished in real time. Overall, if latency between the initial procedures employed and the resulting outcomes is not a limiting factor, the systems described can be implemented in numerous, less efficient embodiments yielding equivalent or superior effective outcomes.

When accounting for mobility especially in respect to form factor, cost, power consumption, and latency—vital attributes for implementation in real time—these variables require novel, clever methods of implementation to redress.

3. Geometry of Multiple Networked Devices

A vital method for addressing issues of the geometry of multiple networked devices is also herein employed. According to a preferred exemplary embodiment, an octahedral configuration, as best shown in conjunction with FIG. 4 through FIG. 6, can provide additional functionality, and enhanced performance in fulfilling its functionality. Such an octahedral configuration may further be actively reduced to adopt a hexahedral, or heptahedral configuration in its operation to realize additional functionality and enhanced performance, where otherwise more suitable in fulfilling aspects of the present invention's functionality, and without limitation to a single configuration.

As should be apparent to those having ordinary skill in the relevant art, in light of the present teachings, the use of a single drone or single user system and the multi drone, one or multi user system can be broadly generalized as a 'mixed reality viewing apparatus' coupled with a view converter in which objects and bodies belonging to 'reality' can be translated, without cooperation or awareness, into digitally representations bringing its presence to be communicated or displayed in the form of mixed reality display visualizations. Users of mixed reality viewing apparatuses are able to then view the digital representations, interacting with them both in tangible reality and the manipulated reality that is displayed, with the digital representations in mixed reality influencing how users interact with the physical equivalents in reality in new, or otherwise additional, manners not necessarily possible without the system.

As should be apparent in light of the present teachings, the three components of the system are needed to interaction in order for such imaging to be implemented. The mixed reality displays, sensing and imaging systems to 'convert' real world items into digital counterparts, and a network allowing the delivery of mixed reality visualizations to displays as derived from sensing and imaging components in addition to hosting the local theatre and interactions within it (e.g., a mixed reality equipped user moving through a digitally representative construct of a structure, with the visualizations delivered to them influenced by their position, and their location within the structure viewable as a digital representation within the digital structure to other users).

The number of devices can be invariant in fulfilling the desired functionality. Aspects such as the procedure for collecting, collating, interpreting, modeling, graphically meshing, and visualizing data may benefit from usage of another geometric configuration without stipulating a change in the physical number, construction, or geometric arrangement of the devices.

In another preferred aspect of the present invention, dependent drones, and in conjunction with mixed reality display devices, may serve directly as edge devices within a network hosted by the master drone. The master drone effectively serves as an edge network relay, where it may process all collected data itself for signature localization, graphical representation, and transmission of graphical representations for visualization in mixed reality display devices. Alternatively, the master drone may collate, and contextualize for transmission to a non-local remote site, or a local site equipped with large computational power which may be a nearby location or a vehicle. A vehicle may be a standard wheeled vehicle (e.g., trucks, other cars), or a tracked vehicle such as tank, APC, or other military vehicles such as non-tracked APCs, Humvees, or trucks. Vehicles may also be equipped with the capability to store, host, and launch the master drone. The master drone may then receive the post-processed and analyzed data, including graphical representations of the data for the master drone to relay to mixed reality devices for visualization.

Localization in conjunction with the present invention may span three primary areas: cooperative localization of known drone locations; cooperative localization of known mixed reality display users; and uncooperative localization of designated target signatures. The primary methods employed for localizing are triangulation, trilateration, and multilateration. Measurement methods may vary across these three primary areas, and may be heavily dependent on the sensors, wireless technologies, and imaging methods employed.

For cooperative localization, the networking methods employed between networked drones and the master drone may employ the master drone and mixed reality display users, between mixed reality users, and between dependent drones in order to fulfill dual uses of data transmission, and location determination. The master drone may provide primary responsibility of monitoring location information between networked devices (e.g., drones, mixed reality display devices), and relaying localized device positions between them. Networked devices also have peer-to-peer limited networking, and localization capabilities.

For dependent drones, BLE, Bluetooth, RFID, NFC, and LIDAR can be used to prevent object collision between drones, LIDAR may also be used by the dependent drones to map the exterior of a structure to both serve as a baseline model to contextualize remotely sensed signatures, and to prevent collision with the structure when performing barrier penetrating remote sensing functions. The same wireless technologies, as well as Wi-Fi, and ultra-wideband (UWB) may be used to determine relative locations of other mixed reality users belonging to the same network. Wi-Fi, UWB, 5G, Bluetooth, millimeter wave implementations, and other wireless networking technologies capable of both communication over longer ranges, as well as transmitting and receiving large amounts of data with low latency are used between networked devices connected to the master drone.

Localization measurement methods may include, but are not limited to, Angle-of-Arrival, Time-of-Flight, Angle-of-Departure, RSSI, Angle-Difference-of-Arrival, Channel State Information, and Time-of-Arrival.

Uncooperative localization relies on various LOS and NLOS remote sensing technologies leveraging the combined usage of various sensors, imagers, and acoustic technologies. These technologies are used in combination to scan areas and collect data which is then collated and analyzed by the master drone to search for machine learning or AI modeled signature patterns in the data associated with various objects or designated targets. Localization measurement methods include, but are not limited to, the aforementioned ones used in cooperative localization.

Localization modalities are described in further depth herein throughout and may include approaches described in the included citations.

According to another aspect of the present invention, the features and benefits of the present improvements may be achieved via various forms of implementation such as, for example, when adapted for use with drone swarm operations. Adapting with drone swarm operation, a user may determine a targeted structure, outdoor area, and flight path for the drones to fly towards through usage of a handheld controller, a handheld laser rangefinder, a head mounted light projector which functions as a ranger finder or a worn orientation sensor functioning as a gesture sensor, or a camera which detects gestures. Controls on the accompanying glasses, headset, or HMD may also be used to issue commands to the drone, including for this purpose. Through these mechanisms drones can be manually controlled and directed towards the intended target location, or automatically fly towards the designated location per the user's selection by wirelessly interfacing with these mechanisms where it may sense the location, use provided coordinates by these mechanisms, or correlate the designated location by these mechanisms alongside its sensing mechanisms.

A drone 340, 350 may also automatically determine a direction location based upon wirelessly interfacing with a headset or glasses, where the drone correlates the terrain input from integrated camera or other sensing mechanisms with the orientation sensors in the headset or glasses and firearm. The drone or drones may determine a direction the user is aiming and fly towards the corresponding direction in order to perform any of a multiple of capabilities. In this usage, the drone may identify a target by wirelessly receiving the user's orientation data which determines the direction the user is aiming and where the drone's camera, sensing mechanisms, and potentially utilizing its localization techniques to interpret its own collected terrain data, collating it with the user's orientation data, to identify a target the user is aiming at within the terrain data captured by the drone. In this usage, the drone may fly to a point between the user and target, measure the azimuth between the user and target, and wirelessly provide the user with the measured azimuth to improve the accuracy of the visualized aiming reticle in the glasses or headset relative to the users intended target.

If the target at which the user has been aiming has moved or the view becomes obscured, the drone 340 may provide the user's glasses or headset 100 with data that can be utilized to display a visualized marker, or highlighted region corresponding to the target's current location. In this usage, the glasses, headset, or head mounted display can illuminate pixels in the see-through display to present the described visualization corresponding to the target's associated cartesian coordinates relative to the user's head orientation and if the target is within the user's field of view. In this usage, if the target is not in the user's field of view, visualized indicators can be provided to the user so they may be able to determine the direction to adjust their head's orientation to bring the target within their field of view, with the indicators calculated within the glasses, headset, or head mounted display from its relative orientation to the cartesian coordinates corresponding to the visualized indicator representing the target's location. In this usage, if the user's field of view was previously unaligned with the target, the head adjustment directional indicators will disappear after the user's head aligns with the target bringing it within the user's field of view where the adjustment indicator visualizations within the see-through-display are replaced by a visualized indicator representative of the target's location.

The user may use the described drone controller mechanisms to command the drone to follow the target, return to the user, wirelessly communicate a video feed of the drones view of the terrain to the user to be visualized within the see-through-display, change the drone's terrain imaging mechanism such as from visible light in a RGB camera to an infrared imaging system or thermal imaging system, follow and maintain its relative location to the user as the user moves to another location, reorient the drone so its imaging mechanism is viewing a new direction.

The drone by default may responsively move its position as the user's location changes, determine if the user is aiming at a target which upon determination triggers the drone to continue monitoring the target's location and following it, measuring the azimuth between user and the target aimed providing that data to the user and the described cartesian coordinate data used by the user's glasses, headset, or head mounted display to create target indicator visualizations. If the drone's battery power is depleted to a level allowing only enough flight time to return to the user, the drone may return to the user. The drone may not travel autonomously further than it can maintain a wireless connection to the user. The user may override the drone's default features that would trigger the drone to return to the user through the described control mechanisms, such as to continue following a target regardless of the drone's remaining energy capacity, with the only exception being the drone's default policy to not travel outside the range it can maintain a wireless connection to the user.

Should the drone's connection to the user be interrupted, it may continue to loiter in the air until a connection is reestablished, or until battery capacity is depleted to a level that provides the drone only enough flight time to return to the user's last known location. In the event of a disrupted connection to the user, the drone may continue following and imaging the last determined target until its battery level is depleted to a level that provides only enough flight time to return to the user's last known location. If an interrupted connection is reestablished between the drone and the user, the drone may resume its provision of data to the user pertaining to the last identified target after determining. If a user is still aiming at the same target, the drone may continue monitoring the position of the last known target if it is within the drone's field of view even if the user has begun aiming in another direction. In such a circumstance, provide corrective aiming data or imaging data may not be provided unless commanded by the user or the user resumes aiming in the last known targets direction. If the user is aiming at a newly determined target, the drone will focus on providing data and tracking the new target and will maintain monitoring the location of previously aimed at targets unless they are outside the field of view of the drone relative to the new target.

After launch, the drone may loiter in the air until the user either issues a command, including a movement adjustment, or until the drone determines a target at which the user is aiming.

The user may use previously described control mechanisms to adjust the drone's settings or use on-drone buttons prior to launch. The drone's settings include whether the drone should lock its focus on a target, including in the event of an interrupted connection, and whether the drone should automatically resume a data feed to the user after reestablishing a connection to the user or await a command to do so, or how long the drone should continue to lock its focus on a target if the user's aim is in a different direction. The user may wirelessly, or via controls on the glasses, headset, or head mounted display, command the drone to lock on a target aimed at and standby until a target is identified, and to unlock the drone's focus on a target and standby until detecting newly aimed at targets. Through these mechanisms the user can also toggle whether to utilize the data received by the drone within the see-through-display system.

Hardware and features used in a drone to assist an individual equipped with a see-through-display aiming system may differ from those present on drones dedicated for other purposes.

Additionally, the employment of drones and see-through-displays in the systems described can incorporate real-time kinematic positioning as an alternative to GPS reliant systems. Utilized as an alternative to GPS, being capable of measuring the azimuth between locations, objects, and people while also being significantly more resilient to detection and interference being allows operation at a very low altitude, in small in form factor, and not reliant on GPS guidance that can be interfered with by electronic warfare systems.

The usage of drones as described is similar to a virtual reference network (VRN) which can similarly enhance precision without using a base station as many other real-time kinematics (RTK) systems utilize. In consideration of this, the system can effectively function as a substantially more capable implementation of Real-time Kinematic Positioning.

For drones used in remote sensing of a terrain or structure and used for networking between multiple see-through-display systems the drones will rely on the same control mechanisms, and additionally can have coordinates issued to the drone which it could use with GPS or other airborne vehicles to provide context to the coordinates.

According to another aspect of the present invention, terrain overhead sensing may be implemented by the same methodologies, sensors, imagers, overall localization methods, and overall hardware as used in structure penetrating remote sensing. The primary areas distinguishing them are the geometric formation employed in its flight pattern (although sharing the same master drone directed, autonomous, wireless flight control methods), its sensing and imaging sequence, its usage of different signature models derived from AI and machine learning in supervised training (while being similar, other signature types would be included with some removed based on relevance, and weights associated with detected data per its relationship to a signature would vary), its assembly of graphical visualizations from remotely sensed data, and the approaches employed in collating data sources (e.g., spectral sources, acoustic sources, EMF sources), data fusion from different sources (e.g., combining the dataset sources originating from each drone), and approach to data interpretation by the master drone. The most fundamental difference, stipulating all other changes as derivatives, is the geometric flight formation employed.

Once released from the master drone inflight, the two sets of drone triplets may take on a triangular formation, with the leading drone triplet having the apex of the triangle front-facing and the two other constituent dependent drones of the triplet having a lower altitude relative to the apex, and with these factors reversed for the trailing drone triplet (e.g., the apex is trailing all other drones, including the two other constituent, dependent drones in the triplet which also have a higher altitude than the apex). The two sets of drone triplets incrementally reverse positions throughout the course of its flight, and half-way between completing a full transition share an overlapping region where the highest signal-to-noise (SNR) in its data, imaging resolution, and localization accuracy exist. The purpose of this is to fulfill the aforementioned quality, as well as easing and enhancing Delaunay triangulation through both the transient intersection of scanned areas between triplets, through the varying altitude in drones (which can be easily compared, with all altitude-variant drones passing over the same area albeit at different altitudes which may be compared), and the capability to compare data from scanned regions—where the regions scanned are the same, but the order of scanning is inversed, relative to the positions of constituent drones in each triplet.

An additional application may include use to assist in identifying the location of individuals for law enforcement, and for EMS (particularly firemen) as the multi-approach sensing and localization methods will empower first responders to rescue a person where vision is obstructed by fire and smoke, and which present difficulties in individual sensing technologies such as thermal imaging and interfering noise to other individual sensing technologies and localization methods influencing the propagation and detection of emitted waves, acoustic sensing, and countless others. However, by means of filtering, supervised machine learning for signature detection, usage of multiple sensing technologies, interfering noise can be filtered out or be used to locate anomalies corresponding to human's in need of rescue from fire—as human signatures will be distinct from near-homogenous presence of fire, although the methods of localization can be affected significantly which the combined usage of multiple localization and sensing technologies will redress, importantly in a timely manner when the usage of the system or its variants in fire rescue is extremely time sensitive presenting fatal outcomes in a delayed response.

Furthermore, firemen and EMS could have their lives jeopardized if sensing technologies are not robust to interference, where the lack thereof could potentially navigate them into inescapable danger. Aside from sensing the presence of humans for this purpose, this system can also assist in mapping the interior of a structure. In this usage the structure may be damaged preventing access through certain routes and this system can assist in predetermining blockages. The system also provides value to EMS in other rescue scenarios, such as during a hurricane or similar weather system, and flooding. The presence of substantial rain coupled with wind can introduce substantial interfering noise to remote sensing technologies and methods of localization, however this can be alleviated by the compounded use of multiple types of remote sensing technologies and localization methods.

Many environmental disasters can present both turbulent weather systems coupled with fire, which can be exceptionally dangerous and presents substantially more confounding factors that introduce interfering noise to sensing technologies. Furthermore, the coupling of confounding factors present greater difficulty in mitigating interference in entirely unique manners, for example the combined presence of turbulent wind, fire, smoke, and possibly rain or storm surge which can create compounded sources of interference that disrupt sensing technologies and localization methods. While isolating and filtering noise from one source of interference can be difficult, the presence of multiple sources with variant properties contributing to interference makes filtering more substantially more difficult and necessitating the usage of multiple types of remote sensing technologies and associated localization methods to redress. For instance, the propagation of an emitted radio wave or imaging laser can witness various interfering effects, where for example a deflected wave may have been subjected to multiple confounding properties contributing to compounded error in filtering and measurement.

In scenarios such as the aforementioned the usage of multiple sensing technologies, filtering techniques, localization approaches, and data fusion could be stipulated in order to successfully redress interference, detect, and localize the presence of a human. The system may also be used to assist in situations of EMS utilizing remote instruction where a remotely located expert helps provide local instruction using wireless communication to another location that is either a relay to the expert, or their location. The expert may use wirelessly obtained camera feeds for obtaining the same visual point-of-view as the EMS responder to then provide instruction on administering expert medical attention where the expert may provide instruction over audio, displaying visualizations to the mixed reality display including text, and areas highlighted or otherwise visually indicated. Additionally, remote sensing sensors described may be used to non-invasively image, provide context for visualizations displayed (e.g., where human internals may be sensed, but with a complete image created via machine learning or AI interpretation of visual and sensor data), and compliment computer vision uses to display more useful, accurate visualizations based off recognized qualities.

Remote instruction through this mechanism may also be used in EMS alongside drones, including manners described, such as for law enforcement operations, or for locating people in disaster response where non-local guidance can be employed to increase the performance efficacy of the responder.

The aforementioned difficulties could also be present to varying extents in combat, making the utilization of multiple sensing approaches necessary to avert single points of failure. For example, in U.S. Pat. No. 9,285,589 cited above, the usage of UWB for networking and sensing is described, but the reliance on it is a single point of failure which many conditions, aside from environmental effects or obfuscated propagation and detection of emitted waves through structures, such as the usage of electronic warfare systems, radio and EM frequencies originating from different, unaccounted for sources all can compound in a manner which render the system unviable, having neutralized efficacy, and yielding no data of tangible value in its use under the conditions, uses, and scenarios for where it may be used.

If a drone will be used to sense targets within a structure, after using the described control mechanisms to identify the structure and direct a drone towards it, the master drone may land atop the structure after it deploys dependent drones unless dependent drones are not launched inflight by the master drone such as launching from another location they're placed, a vehicle such as a tank, APC, truck, Humvee or similar tracked or wheel based vehicle including unmanned vehicles that are not the master drone such as unmanned land, air, or naval vehicles. The master drone may also hover over a structure maintaining a static airborne position, or dynamically fly in proximity to the structure. Dynamic movement adjustments of the master drone inflight around a structure may be in a manner to maintain its geometric formation with dependent drones, emit and receive data or signals, or maintain a connection with networked see-through-displays.

The foregoing descriptions of specific embodiments of the present invention are presented for purposes of illustration and description and are intended to enable numerous advantages. By way of example, aiming mechanisms used in calculation of the visualized reticle's placement in the bitmap of a see-through-display reliant on the usage of cameras present various points of failure such as in the event of damage to the camera, natural or intentional interference of the camera's imaging capability, or obstruction of the cameras imaging capability. Additional hardware and costs are needed to introduce mechanisms that redress these issues.

Figure 8A:
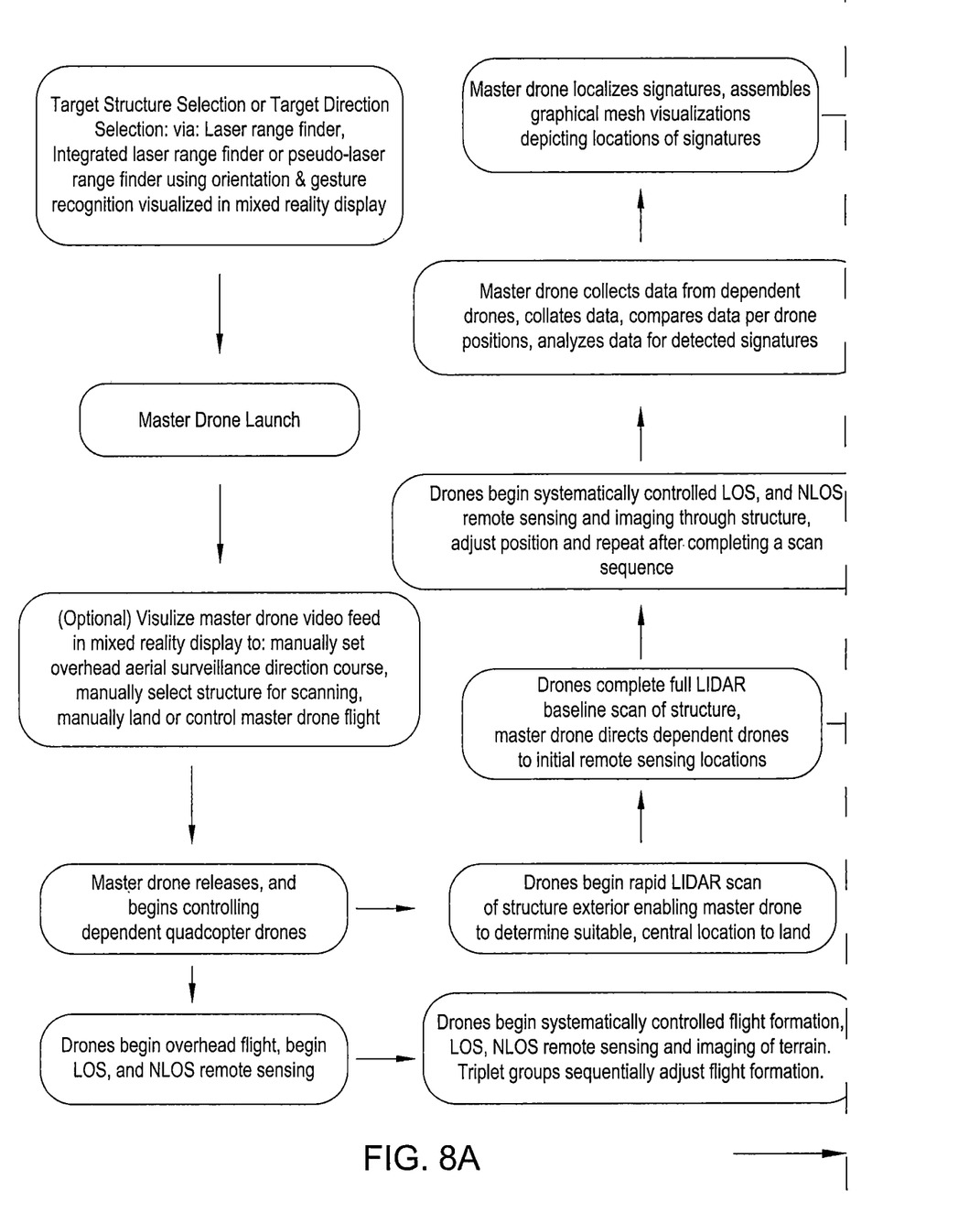
FIG. 8 is a general flow diagram of a typical method and operation of the present system.
Figure 8B:
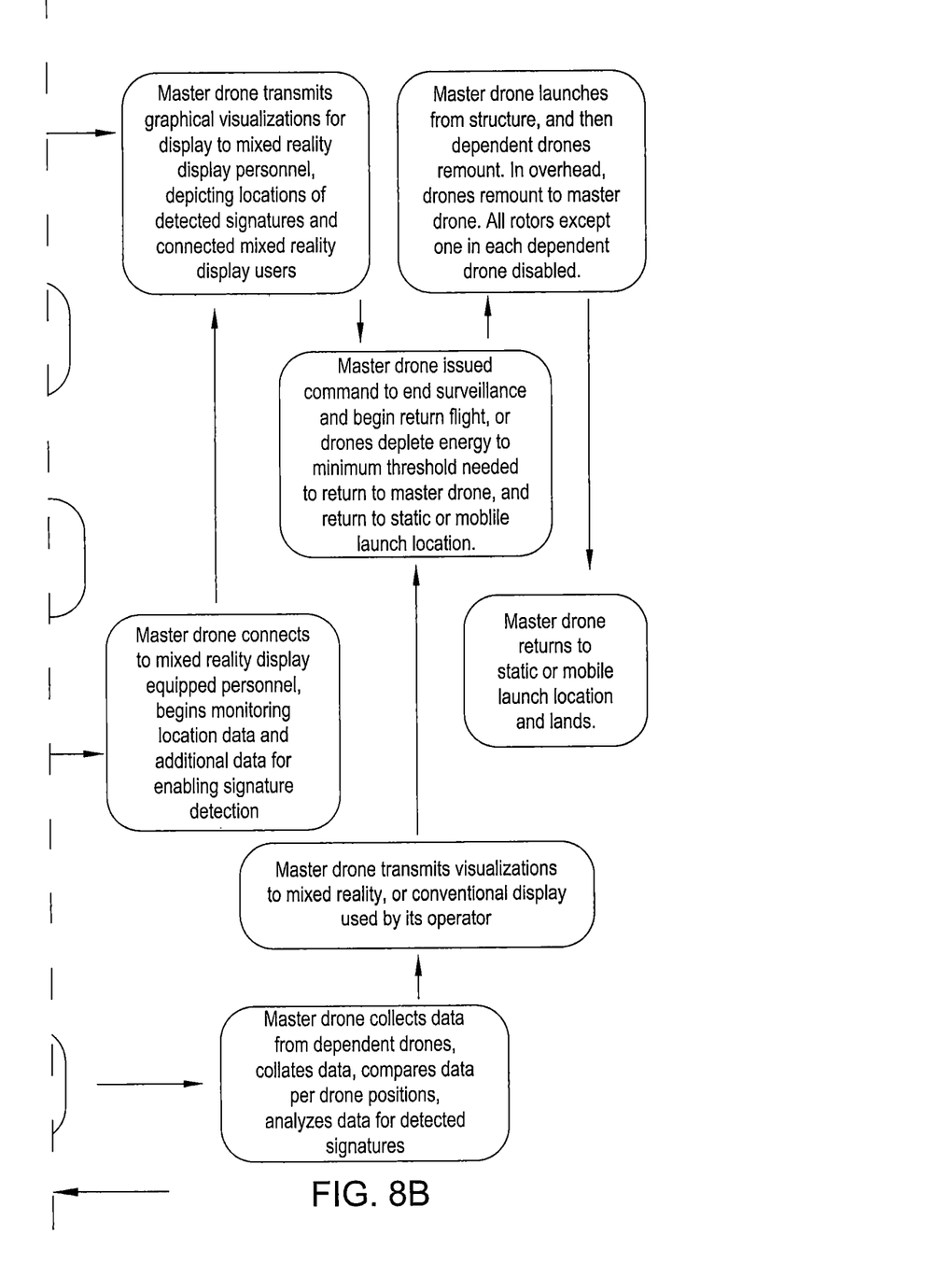

As best described in conjunction with FIG. 8, when scanning a 3D structure, the six dependent drones may be employed in an orientation allowing multi-view orthographic projection-based imaging. Among the dependent drones, two points of view that are opposite in position can be used in visual imaging and LIDAR based boundary sensing to construct a baseline 3D model of a structure. In use, each drone will have a corresponding drone in an opposite position around a 3D structure collecting imaging and LIDAR data. The six total positions of viewing comprise three opposite points-of-view along a vertical Y axis determining top and bottom viewpoints, along a horizontal Z axis capturing front and back views in the elevation of a structure, and along an orthogonal X axis capturing the left and right views along the elevation of a structure. These six planes of projection intersect each other forming a box around the structure, where the imaging and sensing data are projected into the 2D faces of a cube.

The data captured per a moment in time projected onto the 2D faces of a cube can be iteratively assembled into a 3D cube by the master drone where each 3D individual cube is assembled using the marching cubes algorithm to fully depict the 3D structure. Overall, this allows rapid modeling due to both multiple, dynamic points of view and at lower computational demands due to reduced mathematical complexity. Additionally, for remote sensing-based approaches the same approach can be employed for triangulation, trilateration, and multilateration along the 3 opposite viewing planes. In this usage, remotely sensed signatures are placed within the 3D cubes overall creating a 3D model of the structure with signatures situated inside it.

For the three opposite viewing planes, trilateration can be employed between a pair of the opposite viewing points where a signature is identified along the cross-section between circles, it can be executed between three separate drones such as between two opposite positioned drones along an axis and another situated along another axis, it can be utilized with two opposite positioned drones along one axis with the master drone serving as the third detection node which would be situated by default at the center between the drones of one axis, it can be performed by each set of drones along an axis and interpreted together to find a signatures location relative to six different points of view, or three sets of spheres giving the approximated location after data fusion to reduce error.

In 3-D Cartesian space, a fourth sphere eliminates the ambiguous solution that occurs with three ranges, provided its center is not co-planar with the first three. In 2-D Cartesian or spherical space, a third circle eliminates the ambiguous solution that occurs with two ranges, provided its center is not co-linear with the first two.

Finally, the master drone can be used as a third circle in between two opposite positioned drones, with this performed with each set of drones on the X, Y, and Z axis, and the shared master drone used in these measurements to contextualize the 3 sets of 3 circles where the shared master drone is used to determine the relative overlap between the three measurements yielding an approximated signature or position relative to the cross-section of six positions and associated circles spanning the X, Y, and Z axis of a structure. The combination of these measurements will overall reduce error and mitigate noise associated with the remote sensing mechanism. With data from the 'dependent drones' all connecting to the master drone, this allows the contextualization and data fusion to be performed with less steps and associated latency as it occurs all at the master drone. With the master drone performing final measurements with dependent drones only emitting and detecting remotely sensed signatures and positions, as well as transmitting the data to the master drone, given the geometrical constraints of the drones' positions the time-of-arrival measured by drones' can be mathematically reconciled by the master drone.

Methods of triangulation-based localization, and multilateration may employ variant implementations of the same procedure in respect to utilizing the geometric relationship between a pair of symmetric drones scanning the same axis, multiple pairs of symmetrically positioned drones, or any of the drones relative to the master drone. The drone formation operates in two pairs of 3 drones each, otherwise referred to as 'drone triplets', with each of the constituent drones in a triplet corresponding to measuring the X, Y, or Z axis in structural sensing, where each two drones per an axis or viewing point are equidistant to the master drone, symmetrically aligned viewing points, and having an inverse position relative to its associated drone where the master drone is at the center. Each drone triplet maintains a fixed, proportionally scaling geometry for their constituent positions (e.g., maintaining the angles of an equilateral triangle, but the size of the triangle varying), and with the master drone serving as the apex for the triangular positioned drone triplet effectively forming a tetrahedron; with the master drone serving as the apex for both drone triplets, they may be computationally treated as two tetrahedron where one tetrahedron is inversely positioned to the other. Due to the shared apex, and confined geometric relationship among and between drone triplets, data gathered from the drones would be easier to derive correlations from with reduced computational demands. Data gathered by the drones per the geometric confinement, for both overhead and structural scanning, would be expected to overlap such as with sensed points in a cluster graph; while in real life implementation this would not be the case, a greater signal-to-noise (SNR) ratio would still be obtained at lower computational demands by more easily determining signal and filtering noise when determining correlations and collating data between drones given reduced complexity from geometrically position confined properties, associated expectations, known variables (e.g., position of drone, time-of-arrival, RSSI, relative position to another drone), and in addition to supervised machine learning training derived models for signature and object recognition being conducted under these geometric constraints.

Additionally, when the master drone performs data fusion and filtering, it may employ fuzzy math to correct for incidental errors that cause the dependent drones to not be in precise geometric alignment, albeit close enough to allow the acceptable range parameters in fuzzy math for the drones' position to still be effective without compromising measurement and localization calculations or introducing computationally intensive calculations due to aberrations in the relative geometry between drones.

The drones fly in a manner representative of this method in both 3D structure mapping and overhead flight, where formations comprised of three drones each form a triangle and a corresponding inverted triangle. The two 'triplets' of drones in overhead flight cycle between intersecting each other with the master drone situated in the center connecting and contextualizing the data from the two sets of drones where each drone in each triplet has a corresponding drone in the other triplet that is inversely positioned. In overhead flight, as the intersection of the two triplets becomes smaller due to proximity the intersected area gains increasingly greater accuracy with two triangulated regions having a narrower cross-section. The drones fly together as triplets for mapping and structure penetrating remote sensing of a 3D structure as well, with the master drone positioned directly in the center of the oscillating sets of drones. The master drone additionally captures data from its position as well, which is used to contextualize data gathered between drone triplets.

Figure 3:
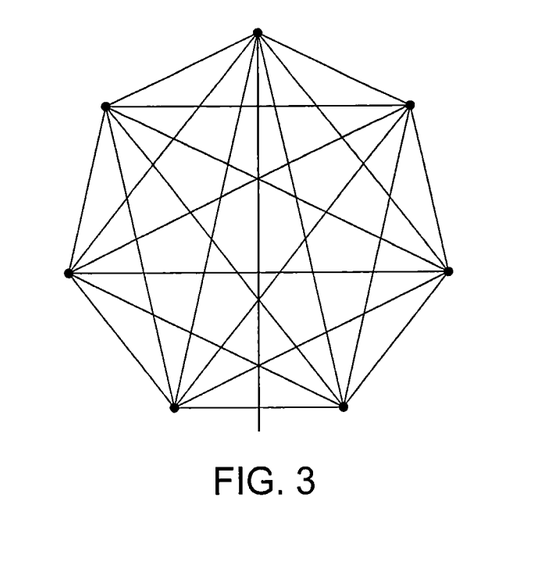
FIG. 3 is a schematic of an operating octahedron for use therewith.

As shown in conjunction with FIG. 3, the overall geometric confinement to operating as an octahedron, otherwise known as geometric projection, simplifies the mathematical and corollary computational demands without sacrificing the resultant definition from the contextualized data captured.

The drones under the geometric projection regime would in total would yield 48 viewing points with 24 being symmetrical, dual viewing points, and 24 cross-sections utilizable for localization methods. The localized cross-sections can be artificially reduced for increasingly greater accuracy depending on the graphing and localization approach, and the assumed projection geometry down to a single cross section with the highest level of accuracy. For example a single compounded cross section, could result in an octahedral graph where all viewing points converge at a single point, or in the intended method for overhead flight where two projected triangles comprised of three drones each where the drones are representative of the vertexes, which can yield the localization between four circles per triplet and eight overall, whereas the inverted tetrahedron, symmetric to the other tetrahedron, self-crosses their triangular regions to form a projected hexagram of six points with an interior projected diamond cross-section yielding a more accurately triangulated region stemming from two compounded triangle regions where the triangulation localization within it will be at its highest accuracy as it converges, before it 'flexes' returning to its original geometry.

In this scenario, the cross-section and flexing occurs via the inverted drone triplet moving at greater velocity until the cross-section between it, and the other drone triplet, reaches its minimum size where the originally leading triplet then increases, and surpasses the velocity of the inversely positioned drone triplet which in tandem decreases velocity to its original value bringing it to its original position relative to the other triplet.

The drone triplets satisfy the requirements as for a tetrahedron, for usage in Delaunay triangulation, and Voronoi triangulation. The triplets are effectively convex polygons where they exist in 3D space not on the same plane and are interlinked with the master drone enabling the usage of the 'flipping' property as it pertains to Delaunay triangulation.

For simplification, in a discrete unit of time the geometry can be best understood as an octahedron and utilizes octahedral symmetry. Only in structural scanning and sensing geometric flight formation is the master drone in a static position, apart from which both flight formations and all other drones are dynamically moving. Since measurements are taken per a discrete unit of time, the geometry can be treated as a 3D object best characterized as an octahedron.

Figures 4, 5, 6:
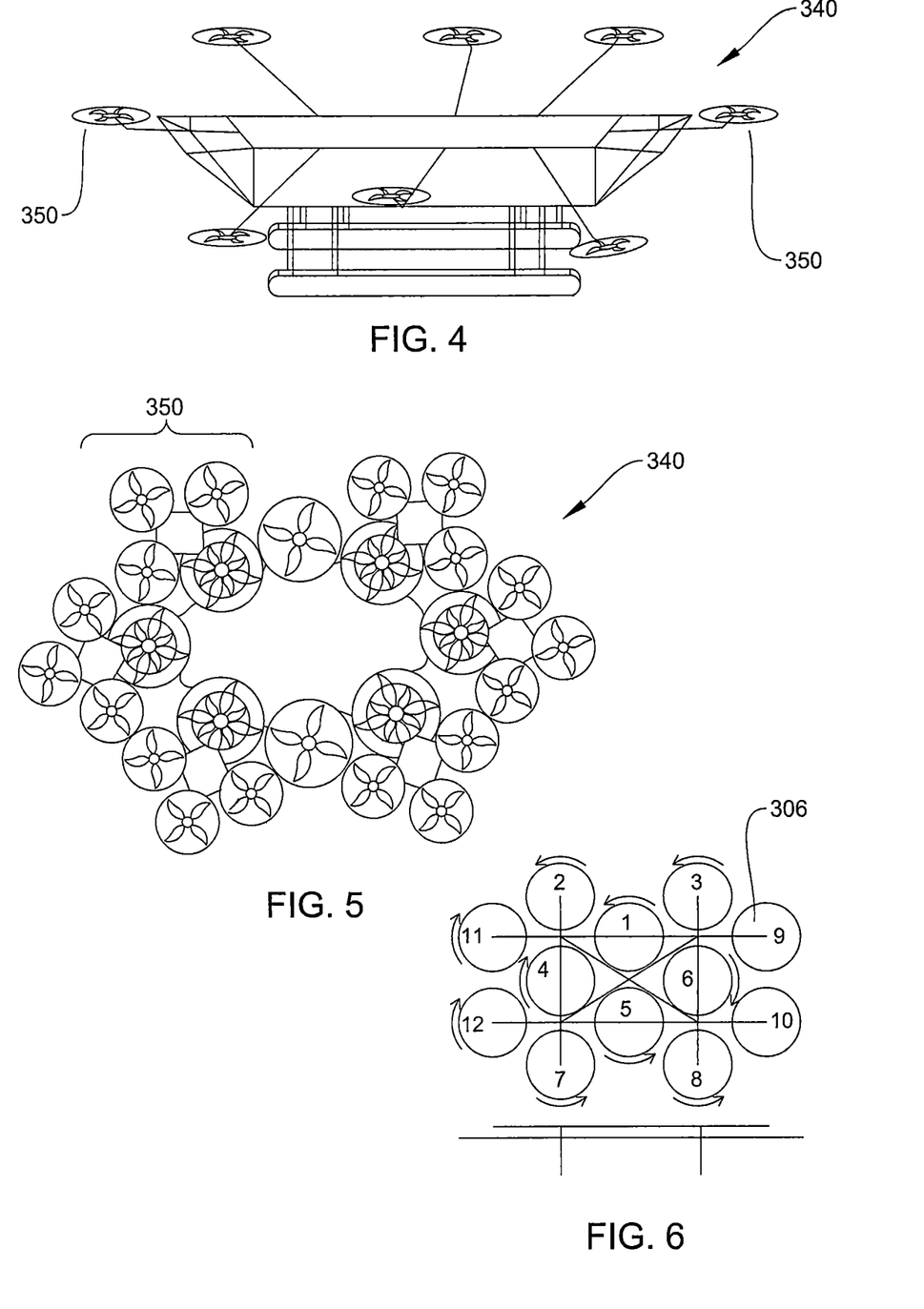
FIG. 4 is a side elevational schematic of an octocopter master drone may incorporate six (6) quadcopter drones.
FIG. 5 is a top plan view thereof.
FIG. 6 is a top plan schematic thereof.
Figure 7A:
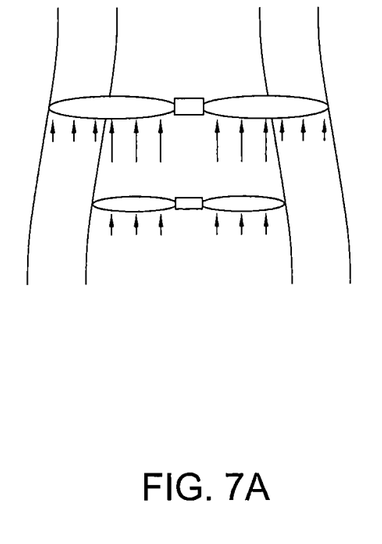
FIG. 7A is a side elevational schematic of a propellor configuration for use therewith.
Figure 7B:
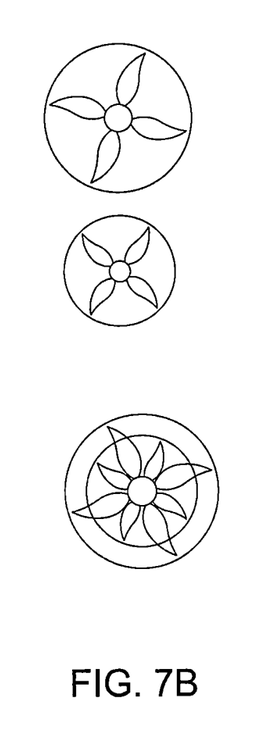
FIG. 7B is a top plan schematic thereof.

Referring now in conjunction with FIG. 4 through FIG. 6, prior to flight, the octocopter master drone may incorporate six (6) quadcopter drones attached where one rotor per quadcopter overlaps with an octocopter rotor. In flight, the three non-overlapping rotors of the attached quadcopters are not utilized, however the overlapping rotor is active, where in usage with the overlapping octocopter rotor creates a wind flow tunnel. The quadcopter rotors and octocopter rotors have a respective 5×5 and 7×5 proportionally sized relationship which enables the flow tunnel, and greater thrust [FIG. 7A and FIG. 7B]. The dependent quadcopter drones detach from the master drone, following which the inactive quadcopter rotors activate and begin their automated flight path managed by the master drone. The quadcopter drones upon returning to the master drone align inflight in order to reattach to a locking and mounting mechanism (not shown).

While in U.S. Pat. No. 9,285,589 the usage of near-infrared light is described for night vision imaging, as opposed to light amplification traditionally used, this is only in application to its usage as an imaging method employed by personnel equipped with a mixed reality display. Additionally, it's described in particular reference to its usage as a helmet mounted apparatus versus directly embedded within the mixed reality display.

Contrarily, its usage in the present invention may involve the dependent drones using Far Wavelength Infrared sensing (FWIR), Far Infrared (FIR) emitted at, or near, 1 mm wavelengths and a frequency of 36-300 GHz which elicits excitation around the surface of the body and does not penetrate it allowing for effective remote sensing of human thermal signatures and identifying their interference with EMF emitted and detected waves per trilateration and triangulation methods.

Additionally, exposure of humans to electromagnetic fields with frequencies above 100 kHz results in body heating through the absorption of energy. Depending on the exposure scenario, this can result either in heating of the whole body, or localized heating of body part, such as limbs or head (See Dragan Poljak, Mario Cvetkovic, Human Interaction with Electromagnetic Fields-Computational Models in Dosimetry (2019)).

In further contrast to usage of infrared imaging in mixed reality displays described in the '589 patent, the present invention may also employ Near-Infrared (NIR) and Mid-Infrared (MIR)-imaging using these IR wavelengths would be done in conjunction with other IR or spectral bands in Hyperspectral Imaging, primarily would be performed by multiple drones, and visualizations derived from these imaging methods would be provided to personnel equipped with mixed reality displays remotely.

FWIR and FIR are intended for use in the Invention being more suitable for its purpose and configured usage, with it having higher radiation at greater distances. Personnel may be equipped utilizing mixed reality displays with IR emitters to work in conjunction with remote sensing performed by drones, although detectors may be employed for infrared imaging where its data feed is visualized and presented to the mixed reality display for use in scenarios where personnel are unsupported by drones.

In this scenario, a thermal or infrared camera may be integrated into the mixed reality display glasses, headset, or HMD (head, or helmet mounted display) where line-of-sight visualizations utilizing the data feeds from the thermal or IR cameras is able to be viewed in the mixed reality display. Additionally, infrared emitters, millimeter waves for local (multiple mixed reality display equipped personnel unsupported by drones) remote sensing and wireless communication between personnel, and other sensors otherwise utilized for NLOS (non-line of sight) remote sensing and wireless communication may have its supporting hardware integrated into the firearm sensor module as utilized in the Related Applications, particularly U.S. Ser. No. 17/737,947, or mounted to a firearm in physically separated hardware relative to the aforementioned sensor module.

NLOS remotely sensed data and detected human signatures may be performed across multiple mixed reality display devices and equipped personnel without support from drones for NLOS detection within a smaller area, with data shared between personnel to assemble local baseline area information and detected human signatures within it, distinguished between friend or foe (FoF) in detection and visualization, for visualization in the mixed reality display. This would be performed in less definition, where approximated positions of friend or foe human signatures are localized between personnel equipped with mixed reality displays and NLOS remote sensing hardware, yielding contrasted visualizations of distinguished FoF human signatures relative to an individual's position and LOS orientation where the detected signatures would be presented in the immediate field-of-view of the individual. Additionally, a visualization, resembling a radar map depicting detected points, which depicts all FoF signatures in a 2D 360° plane with the user situated at the center where the visualization rotates per the LOS orientation of the user. This visualization would be similar to those presented in multiplayer video games such as 'Call of Duty', and due to proliferate use of such games the visualization's interpretation and utilization would be familiar to users—a practice also adopted by the DoD in other projects where military hardware controllers resemble video game controllers to leverage familiarity and lessen requisite training by personnel utilizing it.

Finally, in the use of non-integrated displays including mixed reality displays, and imaging optics such as night vision, FLIR, and thermal optics alongside the systems described in the Invention, the emitted EMF waves can be accounted for in supervised training machine learning derived spectral signature models where their usage can be employed alongside the drones, or local remote NLOS sensing, for filtering out associated EMF or utilizing them as a source contributing to signature detection.

The following claims are hereby incorporated into the Detailed Description, with each claim standing on its own as a separately claimed subject matter. The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A system for networking and data visualization in multiple networked devices, comprising:
   a series of networked drones;
   a head mounted display having a directional antenna directly or indirectly integrated therein; and
   said head mounted display in communication with the antenna and directionally sensing via the antennas, with sensing data collected through the series of networked drones and visualized at the head mounted display, wherein each head mounted display further comprises:
   at least one arc rail on a side or front of the helmet; and
   an auxiliary sensing component affixed to the at least one arc rail and for measuring Time-of-Arrival or Angle-of-Arrival, said auxiliary sensing component selected from a group consisting of: an IR camera; a thermal camera; a visible light camera; and an EMF detector;
   wherein said heads up display is adapted to a modular platform comprising:
   a hardware implementation having:
      a 'see-through-displays' comprising a waveguide lens and an optical element capable of light projection, light propagation, or the excitation of materials to elicit visible light perceivable to the eye and communicates image or video visualized data to the optical element;
      an Inertial Measurement Unit (IMU) for ensuring orientation associated measurements relative to a wearer's head;
      a data communication port or wireless receiver allowing firmware updates to a microprocessor or CPU in communication with the waveguide displays, IMUs and optical elements;
   and
   an open architecture software platform resident on and in operational control of the microprocessor or CPU;
   wherein said software platform is adapted for integration with hardware for mixed reality display operations; and
   wherein the sensing data is shared between the series of networked drones and one or more head mounted display.

2. The system of claim 1, wherein the antenna further is used as a source of signal to support tracking of a plurality of said head mounted displays.

3. A method of two or more systems of claim 1, wherein two or more of said glasses or headsets are configured to display a map or visualization representing relative to known locations and said auxiliary sensing components such that toggling between visualizations is provided between structural maps and remotely sensed items.

4. The system of claim 3, wherein said series of networked drones is operated in a drone formation comprising two pairs of drone triplets, with each of the constituent drones in each drone triplet corresponding to measuring an X, Y, or Z axis in structural sensing, and wherein each two drones per an axis or viewing point are equidistant to the master drone, symmetrically aligned viewing points, and having an inverse position relative to its associated drone where the master drone is at the center.

5. The system of claim 4, wherein each drone triplet maintains a fixed, proportionally scaling geometry for a constituent position with the master drone serving as an apex for the triangular positioned drone triplet effectively forming a tetrahedron.

6. The system of claim 5, wherein said master drone further communicates data in an edge computing network to a non-local site.

7. The system of claim 6, wherein said master drone is adapted to identify pre-selected signatures for gathered data from sensors on said drone triplets.

8. A method of operating a networked drone of claim 4, wherein the drone triplet elements are organized into a formation of a drone triplet and an inverted drone triplet forming an octahedral and traveling in formation that satisfy for usage in Delaunay triangulation and Voronoi triangulation.

* * * * *